2,838,440

DUSTING POWDER OF CARBOXYLIC CATION-EXCHANGE RESIN AND POWDER BASE

Francis M. Thurmon, Boston, Mass., assignor to Rohm & Haas Company, Philadelphia, Pa., a corporation of Delaware No Drawing. Application October 29, 1953
Serial No. 389,149

3 Claims. (Cl. 167—58)

This invention relates to dusting powders having dispersed therein finely particled cation exchange resin having carboxy groups as the reactive functional groups. The powders of this invention comprise said resin in a finely divided state dispersed in or extended with a powder base.

Previous proposals for the use of synthetic resinous materials in powders have concerned phenol-formaldehyde resins of the fusible type and anion exchange resins carrying an acid such as hydrochloric, phosphoric, or sulfuric. The phenol-formaldehyde condensate was suggested to impart vaso-constrictive, analgesic, and possibly disinfectant qualities to a dusting powder. Phenol-formaldehyde condensates in soluble form are not ion exchange resins and do not provide the same action as has been discovered for carboxylic cation exchange resins. Acid-containing amino resins were suggested as so-called non-acid, non-alkaline bodies which could supply acid for neutralizing ammonia in baby diapers. Such materials depend for their action solely upon the acid carried by the amino resin. The resin itself has no evident therapeutic action under these conditions and in free base form has the same order of alkalinity as the objectionable amounts of ammonia with which the acid is to react. There is danger of hydrolysis of the amino resin-acid complex to provide irritation from the trong acid.

It is an object of this invention to provide dusting powders which can be safely and effectively applied to the skin to control the pH thereof. It is an object of this invention to provide powders which restore the skin to its normal pH when the pH has been altered by the presence of diseased tissue or foreign or extraneous material. It is also an object to provide an absorptive powder and one which is non-irritating and cosmetically acceptable for use on the external portions of the human body, even on tender and sensitive skins. It is an object to provide a powder which prevents or inhibits growth or reproduction of organisms including both fungi and bacteria which are sensitive to an acidic environment on the surfaces of the body and which can absorb metabolic products, toxins, or decomposition products from growth of organisms on or close to surfaces of the animal body without causing objectionable irritations even with the presence of chance fissures or cracks. Other objects will appear hereinafter.

These objects are accomplished by mixing together a powder base and a finely particled, purified cation exchange resin having carboxylic groups as the reacting groups thereof and giving a pH between about 3 and about 5.5, as measured in a slurry in a physiological normal saline solution. The resin should preferably form about 5% to about 60% of the mixture for most purposes, although in some instances a carboxylic resin content as low as 2% has been found useful. In many of the compositions of this invention the finely divided resin comprises 15% to 50% of the mixture.

The powder base performs a number of functions. It ensures uniform, even application of the cation exchange resin. It absorbs surface moisture and allows uniform spreading of the composition. It permits an optimum use of a given quantity of ion exchange material, providing maximum efficiency therefor. It prevents too great changes in pH of the skin and is particularly desirable in preventing such large local concentrations as would interfere with salt concentrations and normal respiration of the skin. The effects of the powder base or solid diluent may be summarized with the statement that by actual observation a composition comprising carboxylic resin and solid diluent is more effective than the pure powdered resin by itself.

The powder base used as a diluent and extender for the cation exchange resin comprises materials such as talc, starch, kaolin, zinc oxide, titanium oxide, or the like, serving as slip and covering agents. There may also be used small amounts of metallic soaps such as zinc or magnesium stearate or laurate or other long-chained carboxylate to assist in giving good dispersions and in promoting adhesion. It is of interest to note, however, that the carboxylic resin exchangers, when dispersed in a powder base, have excellent sticking or adhesive properties of their own and seem to supply an electrostatic effect which causes particles thereof to stick to the skin. If desired, permissible lakes and pigments may be used as tinting materials and the powder may be scented.

The powder may be further modified by the presence therein of a small amount of a wetting agent, of an emollient such as a fatty glyceride or lanolin, or of a humectant such as glycerine, or of one or more drugs, including a surface anesthetic. Even though these materials are waxy or liquid substances, they can be taken up in the powder. The wetting agent may be in the form of a powder which is present in fractional amount in the mixture. The properties of typical powders may be improved by use of an agent such as an alkaryl sulfonate which is free of or low in the salts which often accompany these agents. Other wetting and penetrating agents can be used, including cationic and non-ionic agents. Typical wetting agents are octylphenoxyethoxyethoxyethyl sodium sulfonate and octylphenoxypolyethoxyethanols. The wetting agents serve as dispersants in the powder mixture, aid in giving good coverage and adhesion of the powder, provide spreading and penetrating actions, and promote the action of the powdered resin in restoring skin to its normal acidity.

Drugs may be admixed with the dusting powder or with the powder base or may be taken up by the carboxylic exchanger. For example, sulfur or calomel or a sulfanilamide may be mixed in the powder. Other useful solid therapeutic agents are salicylic acid, ammonium chloride, aluminum hydroxychloride, and the like. Phenol or a higher fatty acid may be taken up in talc or other powdered materials which are used as diluents for the carboxylic exchanger. Other therapeutic agents may be similarly used, including antiseptics, such as mercury phenylsalicylate or quaternary ammonium salts. The exchanger may be used to hold small amounts of basic materials, such as local anesthetics or antibiotics. Such materials are nevertheless available for action at the site where the powder is applied, and the exchanger still supplies the desired action of regulating the pH of the surface area.

The powder base may contain talc in an amount up to 90% of the mixture, the usual range being 20% to 85%, clay 0% to 20% or more, zinc stearate 0% to 10%, titanium dioxide 0% to 5%, zinc oxide 0% to 10%, wetting agent 10% to 5%, drug 0% to 20%, etc. A typical formula for a powder base is talc 85%, zinc oxide 10%, and zinc stearate 5%. Another formula comprises talc 80%, titanium dioxide 5%, zinc stearate 7%, and chalk 8%. Still another formula comprises talc 96%, wetting agent 3%, color and perfume 1%.

The cation exchange resins which are used in the dusting powders of this invention are those characterized by the presence of the —COOH group. The resins are insoluble and yet they function as readily available reactive substances which take up cations and supply hydrogen ions. In spite of the fact that the resinous ion exchangers are in a solid, insoluble form, they act as though they were chemical reagents in solution in a wet aqueous system instead of discrete particles in a dust.

Carboxylic exchange resins are prepared from carboxylic acids which contain an unsaturated linkage which permits these acids (or their anhydrides) to enter into copolymers or heteropolymers with polymerizable substances including those which cause cross-linking. For example, as is well known, maleic anhydride and styrene can be polymerized together and when there is present an unsaturated compound having at least two non-conjugated double bonds, an insoluble resin results. The cross-linking agent may be a material such as divinylbenzene, trivinylbenzene, ethylene diacrylate, ethylene dimethacrylate, divinyl ether, diallyl maleate or fumarate or itaconate, or the like. Another source of carboxylic exchangers is based on the copolymerization of acrylic or methacrylic acid and a polyunsaturated polymerizable substance, such as diallyl maleate or fumarate or itaconate, allyl acrylate, allyl methacrylate, diallyl ether, ethylene dimethacrylate, divinylbenzene, or the like. The copolymers or heteropolymers are formed in the conventional way with the aid of a catalyst, such as benzoyl peroxide, lauroyl peroxide, tert-butyl perbenzoate, tert-butylhydroperoxide etc. The carboxylic resins must be purified for purposes of this invention by removing any free monomeric materials in the polymeric product. It is also necessary that any inhibitor which may have been present in the monomeric starting materials and that if catalyst or initiator remains, it be removed. Furthermore, under some conditions of copolymerization there may be salts or other extraneous substances present. These various impurities are removed by one or more suitable steps which include distilling under low pressure or with steam, extracting with solvents, including water, saturating with metal cations and regenerating with acid, and washing the resin thoroughly with deionized water. If acid anhydride groups were present in the copolymer as prepared, they are converted to carboxylic groups as by treating with aqueous acid or aqueous alkali solution and regenerating with acid solution. If a salt form was present, it is, of course, converted to the hydrogen form by treating with an aqueous acid solution. Although this invention is not directed to a process of purifying carboxylic resins, processes for doing this being within the skill of the art, it must be pointed out that for purposes of the claimed invention it is highly desirable and definitely preferable that purified or refined carboxylic resins be employed. The term purified or refined carboxylic resins or similar term is used to show that these resins are essentially free of monomeric materials, catalysts, activators, redox agents, inhibitors, salts, and other extraneous materials which are inevitably present in the copolymers as they are first formed, the exact nature and proportions of which depend upon the choice of starting materials and the mode and conditions of copolymerization.

The resin formed may be crushed to a fine powder. Usually the resin is used in a particle size less than 100 mesh and it is preferable that the bulk of the powdered resin pass a 325 mesh screen. The insoluble carboxylic resins may also be formed by emulsion polymerization and then precipitated as fine particles, which may be used as such or crushed to a still finer form. The pH of the purified resins may, if necessary, be adjusted by adding sufficient basic material to bring a resin of too low pH within the prescribed range of pH. This may be done by adding a small proportion of an alkaline reagent, such as sodium hydroxide or carbonate or of a drug having basic properties. The presence of some of the carboxylic groups in salt form is permissible as the free carboxylic acid groups still function. In a similar way some of the carboxy groups may be used, as indicated above, to hold a drug having a basic group and again some may be converted to the salt form with an inorganic cation which has therapeutic value, such as copper, aluminum, or zinc. This is best done by treating the resin in sodium form with an aqueous solution of a metal salt. Similarly, there may be used a mixed sulfonic-carboxylic ion exchange resin with the sulfonic group in a salt form, such as sodium, calcium, magnesium, copper, or zinc and with carboxy groups free to supply hydrogen ions.

Most of the purified carboxylic resins in hydrogen form have a level of acidity which permits their use directly in the compositions of this invention. Where more strongly acidic groups are present or the carboxylic resin has a marked degree of acidity, the resin may be brought within the effective, useful range, as has been indicated. This range is between pH values of about 3 and about 5.5, best from 3.5 to 5, as determined with a suspension of resin in a physiologically normal salt solution. For purposes of this invention pH is determined for a suspension of about one gram of resin in 25 ml. of an aqueous 0.15 N salt solution. Sodium or potassium chloride may be used as the salt. Since the solution is isotonic, it has significance with respect to conditions apt to be encountered in the practical use of compositions of this invention.

Some examples of mixtures which are typical and useful for various kinds of applications will now be given.

A powder is prepared from 50 parts by weight of a powdered, purified carboxylic exchanger in its hydrogen form prepared from methacrylic acid, styrene, and divinylbenzene, this resin giving a pH of about 4, 45 parts by weight of talc, and 5 parts by weight of starch. The mixture is ground together in a pebble mill and sifted. It is useful as a foot powder, alleviating "athlete's foot" and preventing reoccurrences of this condition.

A powder is prepared by mixing together 10 parts by weight of a purified cation exchange resin from methacrylic acid and divinylbenzene, which resin has a pH of about 3.5, 0.15 part of oxyquinoline sulfate, 5 parts of zinc stearate, 25 parts of talc, and 59.85 parts of corn starch. This powder is successful as a baby powder or as a dusting or bath powder. A similar powder with only 2% of carboxylic resin is also useful for the same purposes.

A powder is prepared by mixing together 25 parts by weight of a cation exchange resin from acrylic acid and divinylbenzene, which resin had been purified by distillation, extraction, conversion to its sodium form, regeneration to its acid form, thorough washing, and drying to a water content of less than 10%, 10 parts of a fine, white clay, 5 parts of zinc stearate, 10 parts of starch, and 50 parts of talc containing a small amount of perfume. This is a general purpose body powder, which serves as an absorbent and soothing medium, and which, like the other powders here described, brings the skin to its normally acidic pH in a relatively short time. For example, the powder is beneficially applied to areas which have been made alkaline as a result of the use of shaving soap. Use of a well-known shaving soap leaves the skin with a pH of about 10 and it has been found that high alkalinity may persist for as long a period as five hours. The above powder applied to such alkaline skin soon restores normal acidity of the skin. Measurement of the pH of skin at about one-half hour or one hour after the dust has been applied shows that the pH is then about 5 to 5.6, depending upon the individual tested.

A powder is prepared from 30 parts by weight of a carboxylic resin made from styrene, divinylbenzene, and maleic anhydride, converted to its acid form, and purified, having a pH of about 4, 10 parts of zinc oxide, 5 parts of zinc stearate, and 55 parts of perfumed talc containing a small amount of precipitated calcium carbonate on which a perfume has been prefixed with the aid of solvents. This powder is effective as a foot powder, an axillary powder and as a soothing body powder.

A powder is prepared by mixing equal parts by weight of talc, clay, starch, and a carboxylic cation exchange resin in its hydrogen form, which resin has been purified through steam distillation, conversion to its sodium form, regeneration with acid, and washing with deionized water, all particles of which pass a 100 mesh screen, 90% passing a 325 mesh screen, and which has a pH of 3.6. This powder is useful in intertrigo.

To the above powder is added 5% by weight of the resin in the form of its aluminum salt. This product is a good foot powder. A similarly useful powder is obtained by using an aluminum hydroxychloride having a pH of 4–4.5 in 5% solution in place of the aluminum salt of the resin.

A purified carboxylic resin from methacrylic acid and divinylbenzene is treated with a solution of streptomycin to form the streptomycin salt of this resin, the resulting product containing about 50% streptomycin. There are mixed 10 parts of this salt in dry form with 90 parts of the resin in its carboxyl form. This mixture is blended with 140 parts of talc and 10 parts of a neutral, finely particled clay. The powder thus obtained is effective for preventing the spread of infections.

A similar product is prepared from tyrothrycin in place of streptomycin, a part of the carboxylic exchange resin being converted to the tyrothrycin form. These powders are effective against common pathogenic organisms found on body surfaces.

A portion of 95 parts of the above carboxyl resin is treated with a solution of 5 parts of N-α-pyridyl-N-benzyl-N′,N′-dimethylethylenediamine and then dried. The product is blended with 120 parts of talc and 20 parts of starch. Upon application of this powder mixture to body surfaces the antihistaminic material is gradually released and histaminic products are taken up.

A composition is prepared by mixing together thoroughly 2 parts of salicylic acid, 5 parts of zinc oxide, 20 parts of a carboxylic resin from acrylic acid and divinylbenzene, 23 parts of starch, and 50 parts of talc. This preparation is effective against seborrhoic dermatitis.

There are mixed 5 parts of finely ground sulfur, 25 parts of a methacrylic acid-divinylbenzene exchange resin, and 70 parts of a powder base containing 10% of kaolin, 88% of talc, and 2% of a soluble, polymeric octylphenoxy-polyethoxyethanol in which there are methylene groups linking phenyl nuclei. This preparation is effective against seborrhoic dermatitis of the face, sternum, axillae, and groins.

A powder base is prepared from 10% of kaolin, 86% of talc, 1% of a wetting agent, a methylene bis(alkylphenoxy-polyethoxyethanol), and 3% of undecylenic acid. There are mixed 75 parts of this base, 13 parts of a methacrylic acid-divinylbenzene cation exchange resin in its hydrogen form, and 10 parts of the zinc salt of this resin. This preparation is effective in common dermatomycoses and/or secondary bacterial infections.

The powders of this invention provide means for restoring, adjusting, and maintaining body surfaces at their normal level of acidity, even though the pH of the surface may have been changed as a result of the presence of extraneous material, as a result of the invasion of microorganisms or from breaking of the skin. The powders serve to prevent and to destroy the growth of organisms. They give prompt relief and are soothing in their effects, overcoming burning and itching and at the same time do not cause chemical venenata. Healing and restoration of normal skin function are evident.

This application is a continuation-in-part of application Serial No. 187,358, filed September 28, 1950, now abandoned.

I claim:

1. As a new composition of matter, a dusting powder comprising 2% to 60% by weight of a refined, finely particled cation exchange resin and 98% to 40% of a powder base, said resin having carboxyl groups as the reactive functional groups thereof and giving a pH between about 3 and about 5.5 in suspension in an aqueous 0.15 N salt solution, the particles of said resin substantially passing a 325 mesh screen and being dispersed in said base.

2. As a new composition of matter, a dusting powder comprising an intimate mixture of a refined, finely divided cation exchange resin, talc, and a small amount of a wetting agent, said resin having carboxylic groups in acid form as its active functional groups and giving a pH of 3.5 to 5 in suspension in an aqueous 0.15 N salt solution, said resin making up 2% to 60% by weight of the composition and the particles thereof substantially passing a 325 mesh screen and being dispersed in the talc.

3. As a new composition of matter, a dusting powder comprising finely particled, refined cation exchange resin and a powder base, the said resin having carboxyl groups as its active functional groups, giving a pH of 3.5 to 5 in suspension in an aqueous 0.15 N salt solution, having its particles substantially passing a 325 mesh screen and making up 15% to 50% by weight of the composition, the particles of resin being dispersed in the powder base.

References Cited in the file of this patent

UNITED STATES PATENTS 2,501,927     Block     Mar. 28, 1950

OTHER REFERENCES

Czetsch-Lindenwald et al., Salben. Puder. Externa., 3rd Ed., 1922, Berlin. J. Springer, pp. 361–363.

J. A. P. A.—Prac. Pharm. Ed., October 1942, pp. 340–341.

Am. J. Pharm., November 1947, vol. 119, pp. 393–394.

Weidman—J. Am. Med. Asso., July 14, 1945, pp. 805–811.

New and Nonofficial Remedies, 1951, J. P. Lippincott, pp. 27–31.